United States Patent
Holverson et al.

(10) Patent No.: US 8,487,215 B2
(45) Date of Patent: *Jul. 16, 2013

(54) METHOD AND APPARATUS FOR WELDING

(75) Inventors: Todd E. Holverson, Appleton, WI (US); James L. Uecker, Appleton, WI (US); Robert R. Davidson, New London, WI (US); Richard M. Hutchison, New London, WI (US)

(73) Assignee: Illinois Tool Works Inc., Glenview, IL (US)

(*) Notice: Subject to any disclaimer, the term of this patent is extended or adjusted under 35 U.S.C. 154(b) by 2227 days.

This patent is subject to a terminal disclaimer.

(21) Appl. No.: 11/286,960

(22) Filed: Nov. 23, 2005

(65) Prior Publication Data

US 2006/0081578 A1 Apr. 20, 2006

Related U.S. Application Data

(62) Division of application No. 10/404,681, filed on Mar. 31, 2003, now Pat. No. 6,974,932.

(51) Int. Cl.
*B23K 9/06* (2006.01)
*B23K 9/10* (2006.01)

(52) U.S. Cl.
USPC .................................. 219/130.4; 219/130.51

(58) Field of Classification Search
USPC .......................................... 219/130.4, 130.51
See application file for complete search history.

(56) References Cited

U.S. PATENT DOCUMENTS

| | | | |
|---|---|---|---|
| 3,253,119 A * | 5/1966 | Manz | 219/130.4 |
| 3,657,724 A | 4/1972 | Feeley et al. | |
| 4,912,299 A | 3/1990 | Oros et al. | |
| 5,218,182 A * | 6/1993 | Vogel et al. | 219/130.32 |
| 5,582,751 A * | 12/1996 | Hagiwara et al. | 219/130.1 |
| 6,023,046 A | 2/2000 | Holverson et al. | |
| 6,329,636 B1 | 12/2001 | Geissler | |
| 6,974,932 B2 * | 12/2005 | Holverson et al. | 219/130.4 |
| 2001/0035399 A1 | 11/2001 | Geng et al. | |
| 2004/0074884 A1 * | 4/2004 | Butler et al. | 219/130.4 |

FOREIGN PATENT DOCUMENTS

| | | |
|---|---|---|
| DE | 37 31 180 | 3/1989 |
| JP | 55 077976 | 6/1980 |
| JP | 56 009062 | 4/1981 |
| JP | 56 009064 | 4/1981 |
| JP | 59179268 | 10/1984 |
| JP | 60 108176 | 10/1985 |
| JP | 7-155948 A * | 6/1995 |

* cited by examiner

*Primary Examiner* — Sang Paik
(74) *Attorney, Agent, or Firm* — George R. Corrigan

(57) ABSTRACT

A method and apparatus for welding include initiating a pulse welding process includes initiating a welding arc by providing CC type welding power, maintaining the arc by providing CV type power. Then, pulse type welding power is provided. The method and system can be used to start short circuit, or other welding processes by providing short circuit power, or welding power of a given mode, instead of providing pulse power. Also, in one alternative, a method and system of initiating a pulse, short circuit, or given welding process includes initiating a welding arc by providing CC type welding power at least until a pseudo-equilibrium for the arc is established. Then, providing welding power in a pulse, short circuit, or the given mode.

20 Claims, 1 Drawing Sheet

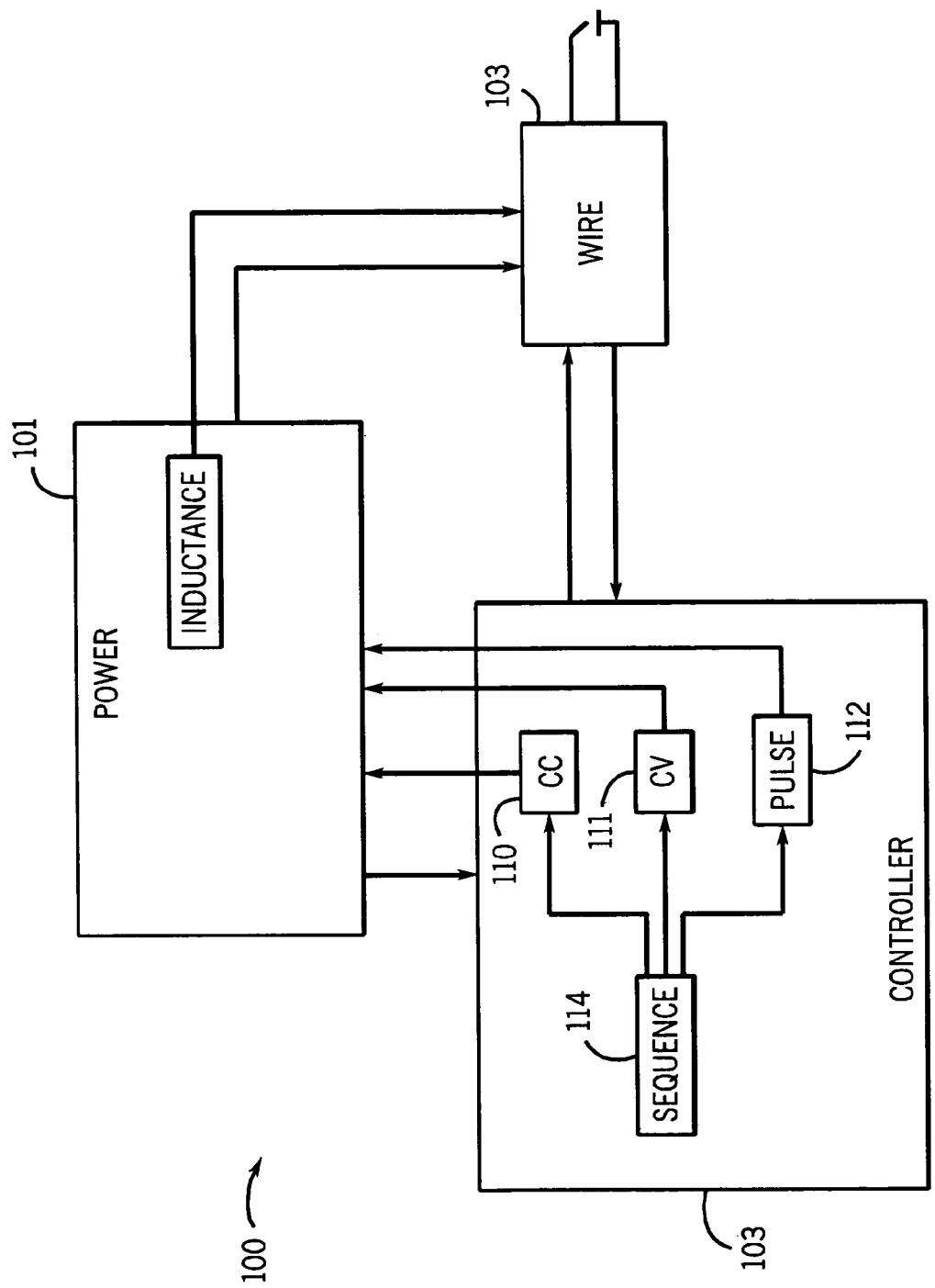

METHOD AND APPARATUS FOR WELDING

Related Applications

This is a divisional of, and claims the benefit of the filing date of, U.S. patent application Ser. No. 10/404,681, filed on Mar. 31, 2003, now U.S. Pat. No. 6,974,932 entitled Method and Apparatus For Welding.

FIELD OF THE INVENTION

The present invention relates generally to the art of pulse welding. More specifically, it relates to the start of a pulse welding process.

BACKGROUND OF THE INVENTION

There are many types of welding power supplies and welding processes. One welding process is referred to as pulse welding. Pulse welding generally consists of the output current alternating between a background current and a higher peak current. Most of the transfer (of the wire to the weld) occurs during the peak state.

There are many known power supplies used for pulse welding. While some of them perform well, one of the more challenging aspects of pulse welding is the start of the process. A number of problems plague starts of the pulse welding process. Among the problems are flare ups, where the wire flares near the tip, or where a piece of wire is violently exploded away from the weld. Another problem includes the arc extinguishing.

Poor starts are particularly troublesome for short (length) welds. For example, three attempts to start a one inch weld will extend nearly the entire one inch. Also, poor starts can lead to shorter tip life. With aluminum starts in particular, the wire can get stuck in the tip and at the start the wire gets burned back up to the tip and damages the tip. Damaged tips can reduce the productivity of the process, as the user needs to stop and replace the tip. Prior art systems claim to be able to make 60,000 consecutive starts using a single tip, but it is preferable to get even more starts from a single tip.

One cause of poor starts is a large ball left at the end of the wire left from the end of a previous weld. Larger balls require more energy to melt. More energy increases the volatility of the start. Also, the variations in ball size make consistent starts difficult. U.S. Pat. No. 6,023,046, commercially available as Sharp Start™ prevents balls from forming at the end of the weld.

Even if the large ball is prevented poor initial contact, improper run-in speed, hot spots, the wire sticking to the tip, and slow current ramps can cause poor starts. Power supplies have not adequately addressed these problems. Accordingly, a pulse welding system that provides for a robust and repeatable starts is desirable. Preferably it will provide for long tip life.

SUMMARY OF THE PRESENT INVENTION

According to a first aspect of the invention a method of initiating a pulse welding process includes initiating a welding arc by providing CC type welding power, maintaining the arc by providing CV type power. Then, pulse type welding power is provided.

According to a second aspect of the invention a welding power supply includes, a source of power, a CC controller, a CV controller, and a pulse controller, all connected to the source of power, and further connected to a sequence controller. The sequence controller first activates the CC controller, then activates the CV controller, and then activates the pulse controller.

According to third and fourth aspects of the invention, short circuit power, or welding power of a given mode, is provided instead of providing pulse power.

The CC type welding power is provided by controlling a CV power source using a high gain, or by controlling a CC power source in various embodiments The CV type power is MIG power, and/or is provided using a power source with a controlled output inductance in other embodiments, The CC power has a current rate of increase of at least about 500, 1000 or 2000 amps/millisecond in some embodiments.

The transitions from CC to CV, and CV to pulse, are made after a time elapses in one embodiment.

The CC type welding power is provided when the wire is at run-in speed, in another embodiment.

The CC type welding power is provided at a current magnitude of at least 300 amps, and/or the CV power is provided at a voltage magnitude of between 20 and 40 volts in other embodiments.

According to a fifth aspect of the invention a method and system of initiating a pulse, short circuit, or given welding process includes initiating a welding arc by providing CC type welding power at least until a pseudo-equilibrium for the arc is established. Then, providing welding power in a pulse, short circuit, or the given mode.

According to a sixth aspect of the invention, a method of repeatedly starting a pulse welding process for aluminum wire includes starting the process, establishing a pseudo-equilibrium arc with aluminum wire, and repeating at least 70,000 times without changing the contact tip.

Other principal features and advantages of the invention will become apparent to those skilled in the art upon review of the following drawings, the detailed description and the appended claims.

BRIEF DESCRIPTION OF THE DRAWINGS

FIG. 1 is a block diagram of a welding system made in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a preferred system and method, it should be understood at the outset that the start of the pulse welding process described and claimed can be implemented with other welding systems and methods.

Generally, the preferred embodiment provides for starting the pulse welding process by providing a constant current (CC) type power output to initiate the arc, followed by a constant voltage (CV) type power to maintain the arc, and then transitioning to a pulse type power to perform the pulse process.

CC type power, as used herein, is power provided at a substantially desired current, or a desired current slope, and includes both open and closed loop controls. Pulse type power, as used herein, is power suitable for pulse welding. CV type power, as used herein, is power provided at a substantially desired voltage, or a desired voltage slope, and includes both open and closed loop controls.

The preferred embodiment provides for a single power source, such as that described in U.S. Pat. No. 6,329,636, Method And Apparatus For Receiving A Universal Input Voltage In A Welding, Plasma Or Heating Power Source, issued Dec. 11, 2001, hereby incorporated by reference. The '636 power source generally rectifies input power and creates a high voltage bus. An inverter inverts the bus, and the amount of power is controlled by pulse width modulating the inverter. The output of the inverter is transformed to a level suitable for welding. Other embodiments include other power topologies such as phase controlled sources, choppers, transformers, etc. Generally, the topology used to provide power is not important to practicing the invention.

One reason the power supply of the preferred embodiment is used is it is easy to control the desired types of output power. The controller for the power supply includes a CV controller, a CC controller, and a pulse controller, allowing the '636 power source to emulate a CV power source, a CC power source, and a pulse power source. Other power sources may be used, such as ones that require multiple power circuits to provide the different types of power, or power source that, while providing the various types of power, do not do so as effectively, and still be within the scope of this invention.

CC power source, as used herein, is power that provides CC type power. CC controller, as used herein, is a controller that causes the output to be CC type power. Controller, as used herein, includes digital and analog circuitry, discrete or integrated circuitry, microprocessors, DSPs, etc., and software, hardware and firmware, located on one or more boards, used to control a device such as a power supply. CV controller, as used herein, is a controller that causes the output to be CV type power. CV power source, as used herein, is power that provides CV type power. Pulse controller, as used herein, includes a controller that controls a pulse welding process. Source of power or power source, as used herein, includes the power circuitry such as rectifiers, switches, transformers, SCRs, etc that process and provide the output power.

The controller also includes a sequence controller that controls the transitions between the various welding modes. The preferred embodiment provides for the transition to be based on time, but other parameters, such as welding current or voltage, energy power, etc, could be used. Sequence controller, as used herein, includes a controller that controls the sequence of a welding process, such as providing first CC power, then CV power, etc. A welding mode, as used herein, is the type of process or output used, such as CC, CV, pulse, MIG, spray, short circuit, etc.

Turning now to FIG. 1, a welding system 100 in accordance with the present invention includes a power source 101, a controller 103, and a source of wire 105 that cooperate to provide welding power at electrode 107 and work piece 108. Power source 101 is preferably an inverter-based power source such as that disclosed in U.S. Pat. No. 6,329,636. Power source 101 includes a controllable output inductance, such as that shown in the '626 patent and has a relatively low inductance, such as 10 microhenry when not controlled. Controlled inductance, as used herein, includes as inductance that may be dynamically modified. The low output inductance allows the power supply to rapidly change current despite providing a CV output. Low output inductance, as used herein, with reference to a CV power supply, includes an output inductance that allows rapid current changes, such as 500 amps/msec or more. Power source 101, in the various embodiments, provides a rate of change of current of more than 500, 1000, or 2000 amps/msec.

Controller 103 is implemented using software and a microprocessor, along with discreet components, in the preferred embodiment. Other embodiments use a DSP, all discreet circuitry, or just a microprocessor. Controller 103 includes a CC controller 110, a CV controller 111, a pulse controller 112 and a sequence controller 114, which cooperate to control power source 101 at the start of the welding process.

Sequence controller 114 activates CC controller 110 to, control power source 103 to initiate the arc. CC controller 110 controls power source 101 such that it provides a CC output. Once an arc is detected (by comparing current feedback to a threshold and voltage feedback to a threshold) CC controller 110 remains active for a fixed period of time. The preferred embodiment uses the presence of current flow and a voltage greater than about 25 volts to indicate an arc is present, although other arc detection schemes will also work.

The CC current is controlled to be 350 or more amps, and the CC mode lasts for 1-10 msecs, depending on wire size, type, workpiece thickness, workpiece material, etc. in the preferred embodiment. The preferred control scheme is used to handle the run-in phase, which requires a changing amount of energy as the wire feed speed changes from run-in speed to welding speed.

350 amps is a relatively high current level, and if it is maintained for too long a period of time, the wire will burn back to the tip. Alternatives provide for other CC mode durations, including greater or lesser durations. Another alternative provides for sensing dP/dt to sense when the short (that exist prior to the arc being formed) is about to break and then reduce the current so as to avoid a flare up or spatter. Still other alternatives provide for ending the CC mode when a desired amount of energy has been provided to the wire and puddle.

The end of the CC mode occurs when sequence controller 114 deactivates CC controller 110 and activates CV controller 111. This causes power supply 101 to make a transition from CC power to CV power output. Transition, as used herein, includes changing from one sequence or mode of a welding process to another, and may occur very quickly or over a period of time. This mode lasts for a time dependent on wire size, wire type, gas type, etc, in the preferred embodiment. It is preferably in the range of is 20 to 200 msecs. An alternative is to remain in the CV mode until a desired amount of energy has been provided to the wire/puddle. Another alternative is to remain in the CV mode until a the current falls below a threshold. This indicates the wire has burned back from the work such that a short circuit would be unlikely. If this alternative is used it is best to avoid extinguishing the arc in the subsequent pulse mode because the arc is too long.

The end of the CV mode occurs when sequence controller 114 deactivates CV controller 111 and activates pulse controller 112. This causes power supply 101 to provide a pulse power output. This mode is the start of the pulse process and the end of the arc starting procedure.

Alternatives include providing a CV phase instead of the CC phase, but using a CV mode with a high gain, to emulate a CC output, in regards to its ability to rapidly increase the output current. High gain, as used herein, with reference to controlling a CV power source, includes providing gain such that the CV power supply emulates a CC power supply. Another alternative is to provide MIG-type power during the CV phase. MIG type power, as used herein, includes a power supply that provides an output suitable for MIG welding.

Another alternative provides for CC type power when the arc is initiated until the arc reaches a pseudo equilibrium. Pseudo-equilibrium for the arc, as used herein, includes establishing conditions in the weld (including the base material and weld puddle) that are substantially equal in temperature distribution to the steady state welding conditions.

Still other alternatives adjust the thresholds and/or times based on operator-provided information such as material thickness, material type, type of joint, orientation of the joint, etc.

Additional alternatives include using the present invention to start other processes, such as short circuit welding, MIG welding, etc. These alternatives may be implemented by substituting the desired process for the pulse process of the preferred embodiment.

Using the present invention can provide consistent starts, and help extend tip life. For example, more than 70,000, and even up to more than 73,000 consecutive starts with aluminum wire were able to be performed on a single tip using the present invention.

Numerous modifications may be made to the present invention which still fall within the intended scope hereof. Thus, it should be apparent that there has been provided in accordance with the present invention a method and apparatus for starting a pulse welding process that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of initiating a pulse welding process, comprising:
    initiating a welding arc by providing CC type welding power at least until a pseudo-equilibrium for the arc is established; and
    thereafter providing welding power in a pulse mode.

2. The method of claim 1, further comprising, before providing welding power in a pulse mode, maintaining the arc by providing CV type power.

3. The method of claim 1, wherein the CC type welding power is provided by controlling a CV power source using a high gain.

4. The method of claim 2, wherein the CC type welding power is provided by controlling a CC power source.

5. The method of claim 4, wherein providing CV type welding power further includes providing MIG type power.

6. The method of claim 5, wherein providing CV type welding power further includes controlling a power source with a controlled output inductance.

7. The method of claim 6, wherein controlling the output inductance includes increasing the output inductance.

8. The system of claim 7, wherein the source of power includes a CV power source and the CC controller provides a high gain.

9. The system of claim 8, further comprising a CV controller connected to the source of power, and wherein the sequence controller is connected to the CV controller and wherein the sequence controller first activates the CC controller, then activates the CV controller, and then activates the pulse controller.

10. The system of claim 7, wherein the power source includes a CC power source.

11. The system of claim 8, wherein the CV power source has a controlled output inductance.

12. A system for pulse welding, comprising:
    a source of power;
    a CC controller connected to the source of power;
    a pulse controller connected to the source of power; and
    a sequence controller connected to the CC controller, and connected to the pulse controller, wherein the sequence controller first activates the CC controller, then activates the pulse controller after a pseudo-equilibrium for the arc is established.

13. A system of initiating a pulse welding process, comprising:
    means for initiating a welding arc by providing CC type welding power at least until a pseudo-equilibrium for the arc is established; and
    means for thereafter providing welding power in a pulse mode.

14. A method of initiating a given welding process using a given type of power, comprising:
    initiating a welding arc by providing CC type welding power at least until a pseudo-equilibrium for the arc is established; and
    thereafter providing welding power in the given type of power.

15. The method of claim 14, further comprising, before providing welding power in the given mode, maintaining the arc by providing CV type power.

16. The method of claim 15, wherein the given type of welding power is provided by controlling a CV power source using a high gain.

17. The method of claim 16, wherein providing CV type welding power further includes providing MIG type power.

18. The method of claim 17, wherein providing CV type welding power further includes controlling a power source with a controlled output inductance.

19. A system for providing welding power in a given mode, comprising:
    a source of power;
    a CC controller connected to the source of power;
    a final controller connected to the source of power; and
    a sequence controller connected to the CC controller, and connected to the final controller, wherein the sequence controller first activates the CC controller, then activates the final controller after a pseudo-equilibrium for the arc is established.

20. A system of initiating a given type of welding process, comprising:
    means for initiating a welding arc by providing CC type welding power at least until a pseudo-equilibrium for the arc is established; and
    means for thereafter providing welding power in the given mode.

* * * * *